(12) United States Patent
Takahashi

(10) Patent No.: US 11,373,777 B2
(45) Date of Patent: *Jun. 28, 2022

(54) TECHNETIUM 99M ISOLATION SYSTEM AND TECHNETIUM 99M ISOLATION METHOD

(71) Applicant: KYOTO MEDICAL TECHNOLOGY CO., LTD, Kyoto (JP)

(72) Inventor: Naruto Takahashi, Kyoto (JP)

(73) Assignee: KYOTO MEDICAL TECHNOLOGY CO., LTD, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/437,897

(22) PCT Filed: Feb. 27, 2020

(86) PCT No.: PCT/JP2020/007936
§ 371 (c)(1),
(2) Date: Sep. 10, 2021

(87) PCT Pub. No.: WO2020/184196
PCT Pub. Date: Sep. 17, 2020

(65) Prior Publication Data
US 2022/0044836 A1 Feb. 10, 2022

(30) Foreign Application Priority Data

Mar. 11, 2019 (JP) .............................. JP2019-043911

(51) Int. Cl.
*G21G 4/08* (2006.01)
*G21G 1/00* (2006.01)
*B01D 11/04* (2006.01)

(52) U.S. Cl.
CPC ......... *G21G 1/001* (2013.01); *B01D 11/0423* (2013.01); *B01D 11/0434* (2013.01);
(Continued)

(58) Field of Classification Search
CPC ........... G21G 1/001; G21G 2001/0036; G21G 2001/0042; B01D 11/0423; B01D 11/0434; B01D 11/0488; B01D 11/0492
See application file for complete search history.

(56) References Cited

FOREIGN PATENT DOCUMENTS

| JP | 2001-96101 A | 4/2001 |
|---|---|---|
| JP | 2004-535288 A | 11/2004 |

(Continued)

OTHER PUBLICATIONS

Written Opinion of the International Searching Authority (WO/ISA) in corresponding International Patent Application No. PCT/JP2020/007936, dated May 12, 2020, with partial English translation.

(Continued)

*Primary Examiner* — Zulmariam Mendez
(74) *Attorney, Agent, or Firm* — Renner, Otto, Boisselle & Sklar, LLP

(57) ABSTRACT

An initial introduction control part introduces an aqueous solution containing molybdenum 99 and technetium 99m, and an organic solvent being capable of dissolving the technetium 99m into an extraction tank. A micro-mixing control part micro-mixes the aqueous solution and the organic solvent by heating and stirring a mixed solution of the aqueous solution and the organic solvent introduced into the extraction tank with a heater, while applying ultrasonic to the mixed solution. A separation control part separates the mixed solution micro-mixed into two phases of aqueous solution and an organic solvent. A taking-out introduction control part passes the organic solvent separated into two phases through an adsorption column be capable of adsorbing molybdenum 99 and introduces the organic solvent into an evaporation elution tank. An evaporation control part evaporates the organic solvent and leaves residue by reducing pressure inside the evaporation elution tank and heating (Continued)

the organic solvent introduced into the evaporation elution tank with a heater, while applying ultrasonic to the organic solvent. An elution control part introduces physiological saline solution into the residue and elutes technetium 99m into the physiological saline solution from the residue.

19 Claims, 7 Drawing Sheets

(52) U.S. Cl.
CPC ...... *B01D 11/0488* (2013.01); *B01D 11/0492* (2013.01); *G21G 2001/0036* (2013.01); *G21G 2001/0042* (2013.01)

(56) References Cited

FOREIGN PATENT DOCUMENTS

| | | |
|---|---|---|
| JP | 2016-29337 A | 3/2016 |
| JP | 2018-76255 A | 5/2018 |
| WO | 2014/057900 A1 | 4/2014 |

OTHER PUBLICATIONS

International Search Report (ISR) in corresponding International Patent Application No. PCT/JP2020/007936, dated May 12, 2020, with partial English translation.
R.E.Boyd, "Technetium-99m Generators—The Available Options", International Journal of Applied Radiation and Isotopes, 1982, vol. 33, pp. 801-809.

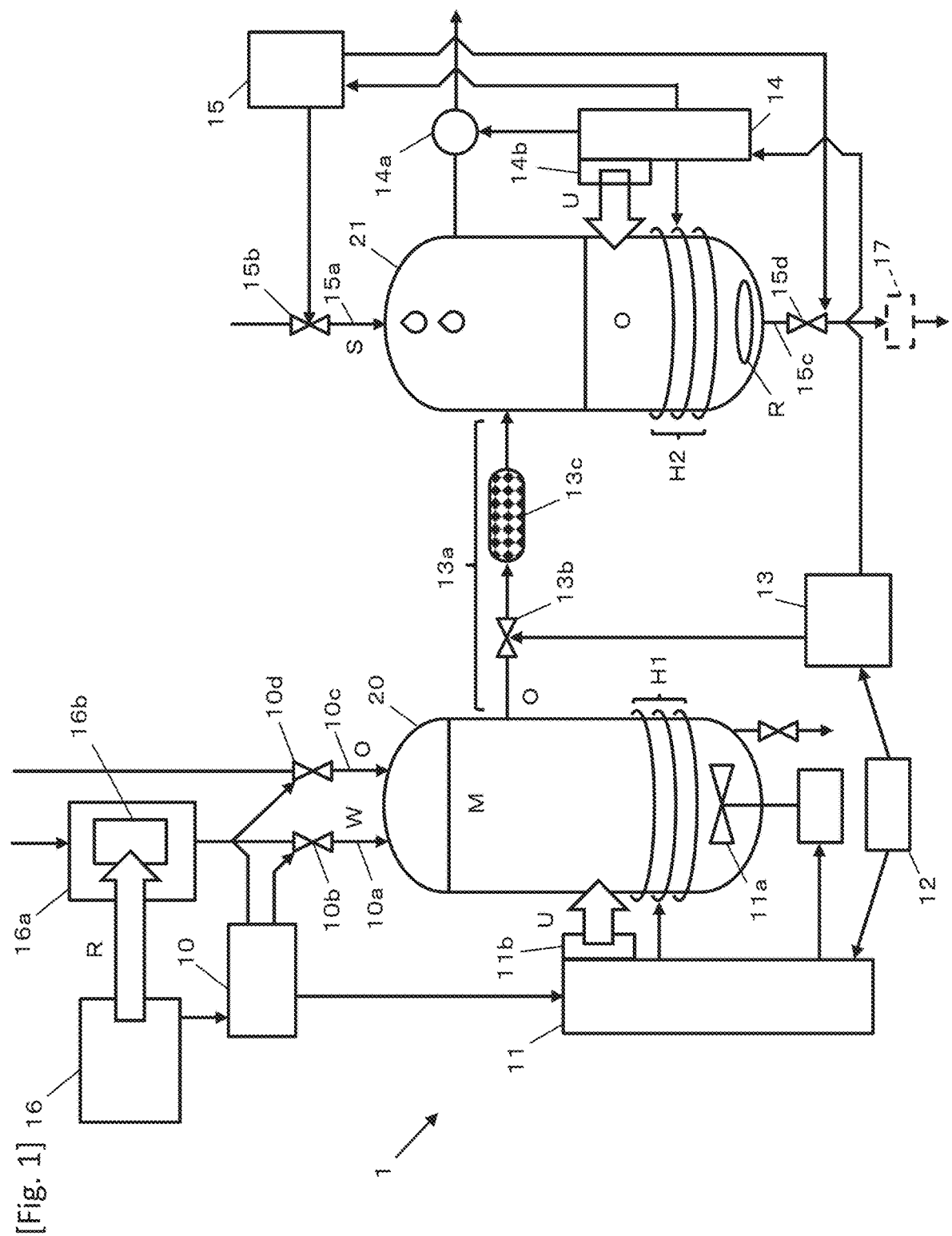
[Fig. 1]

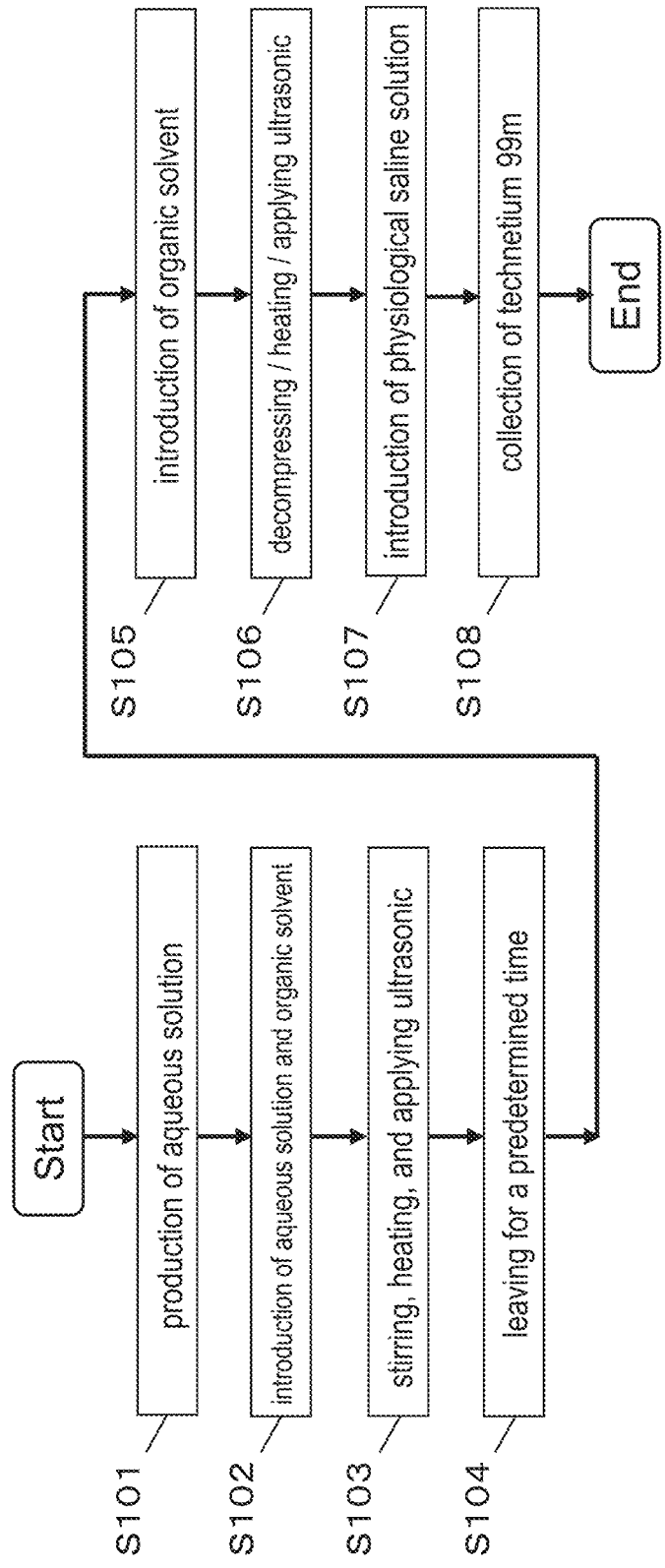
[Fig. 2]

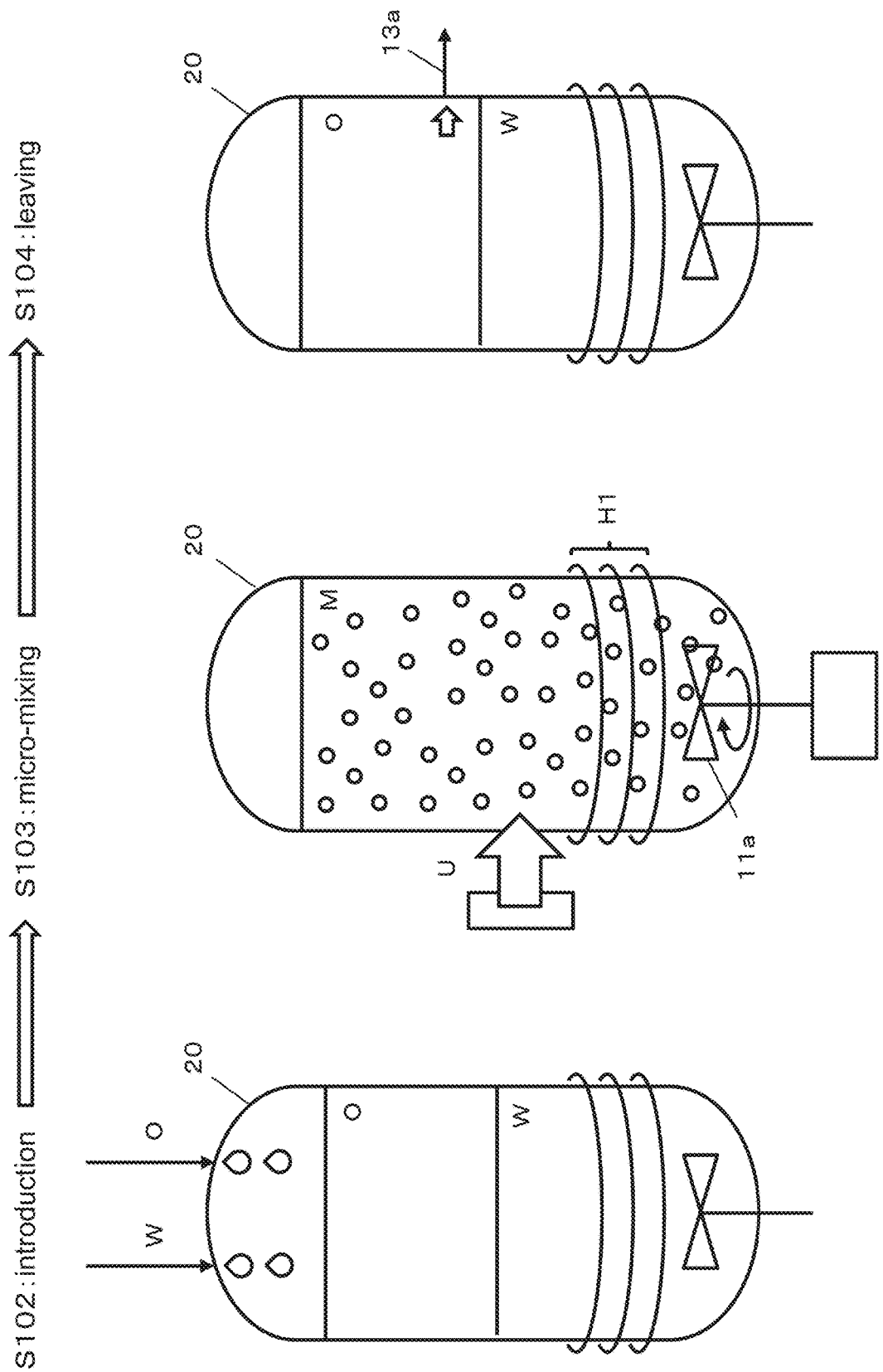

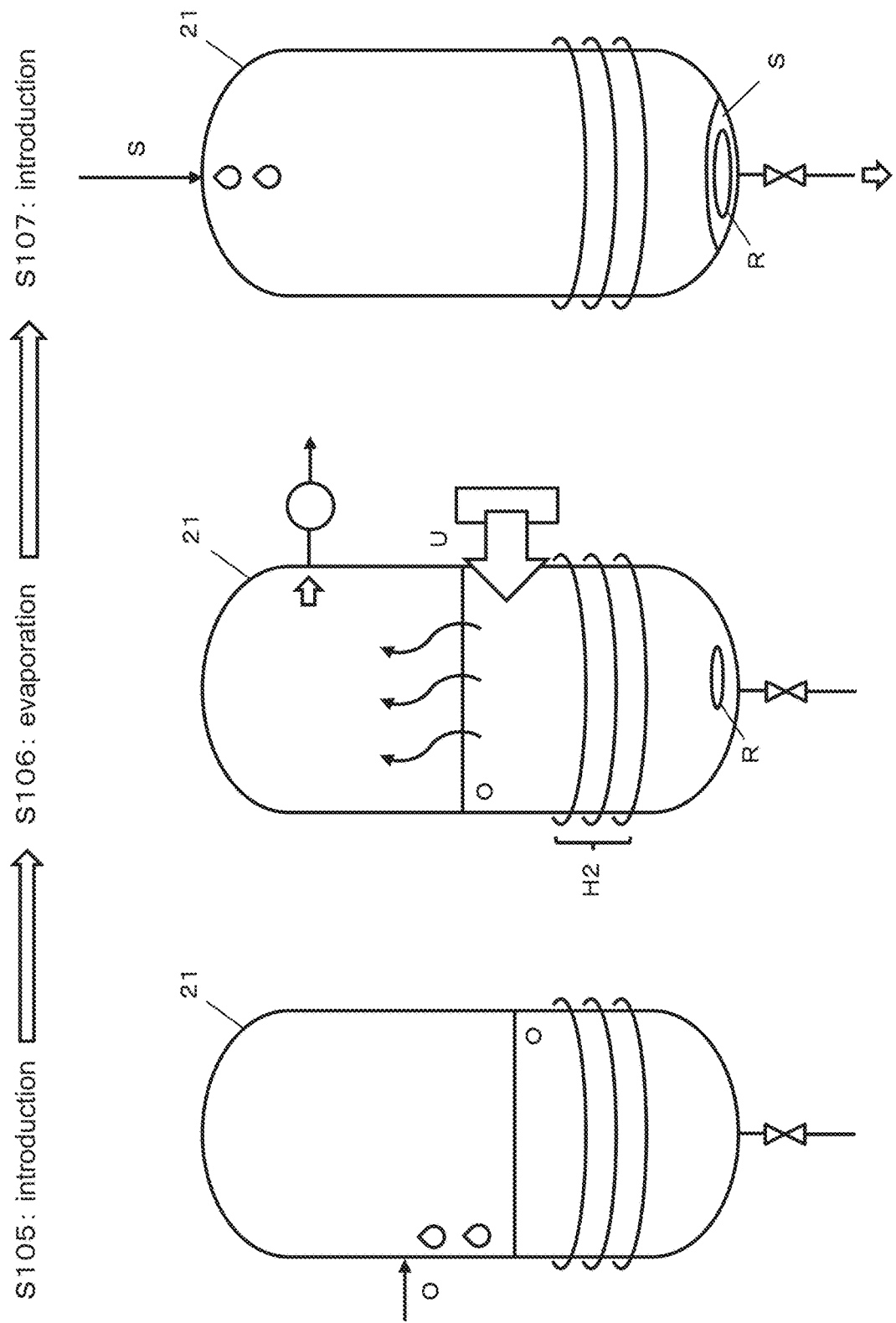
[Fig. 4]

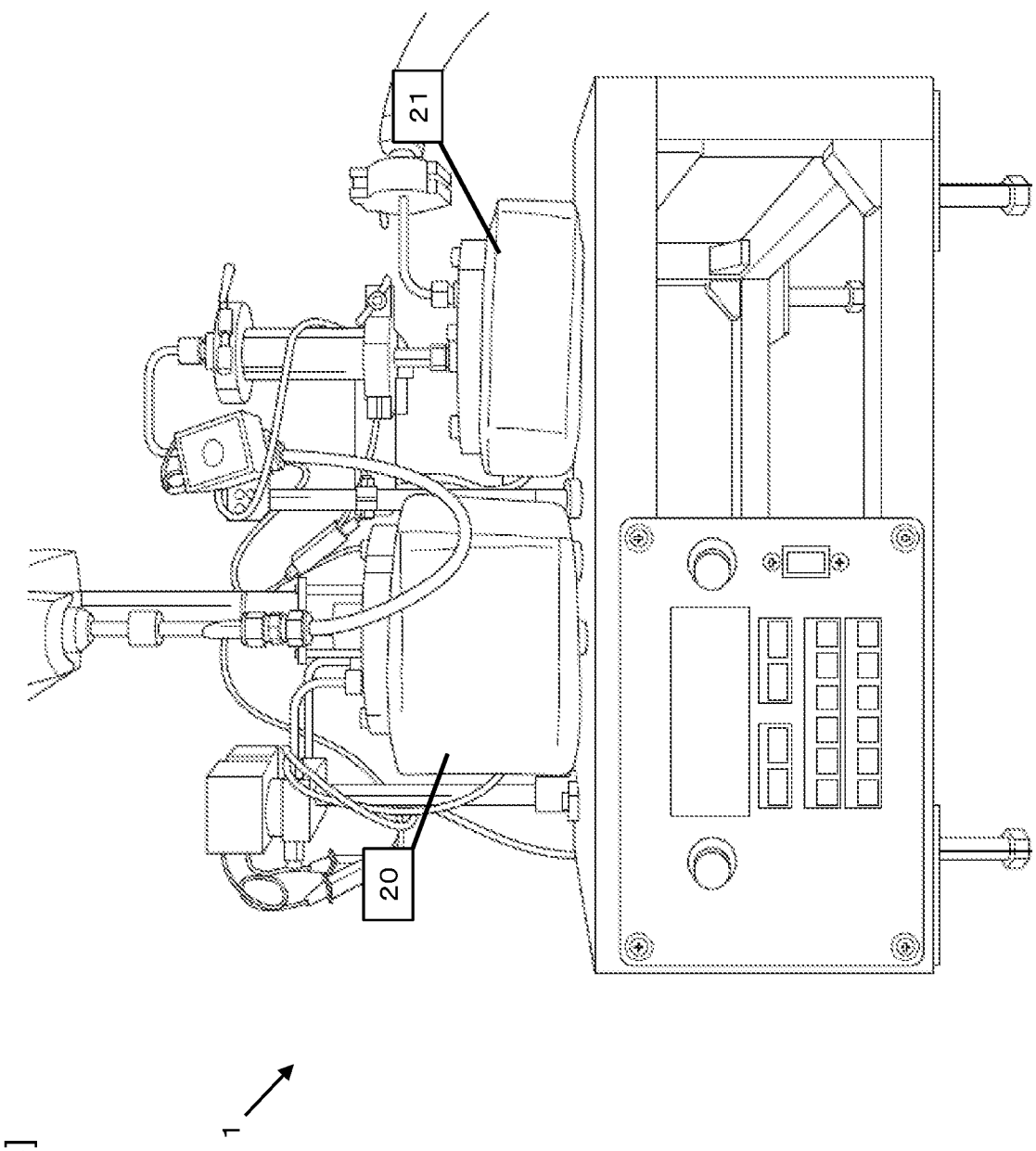
[Fig. 5]

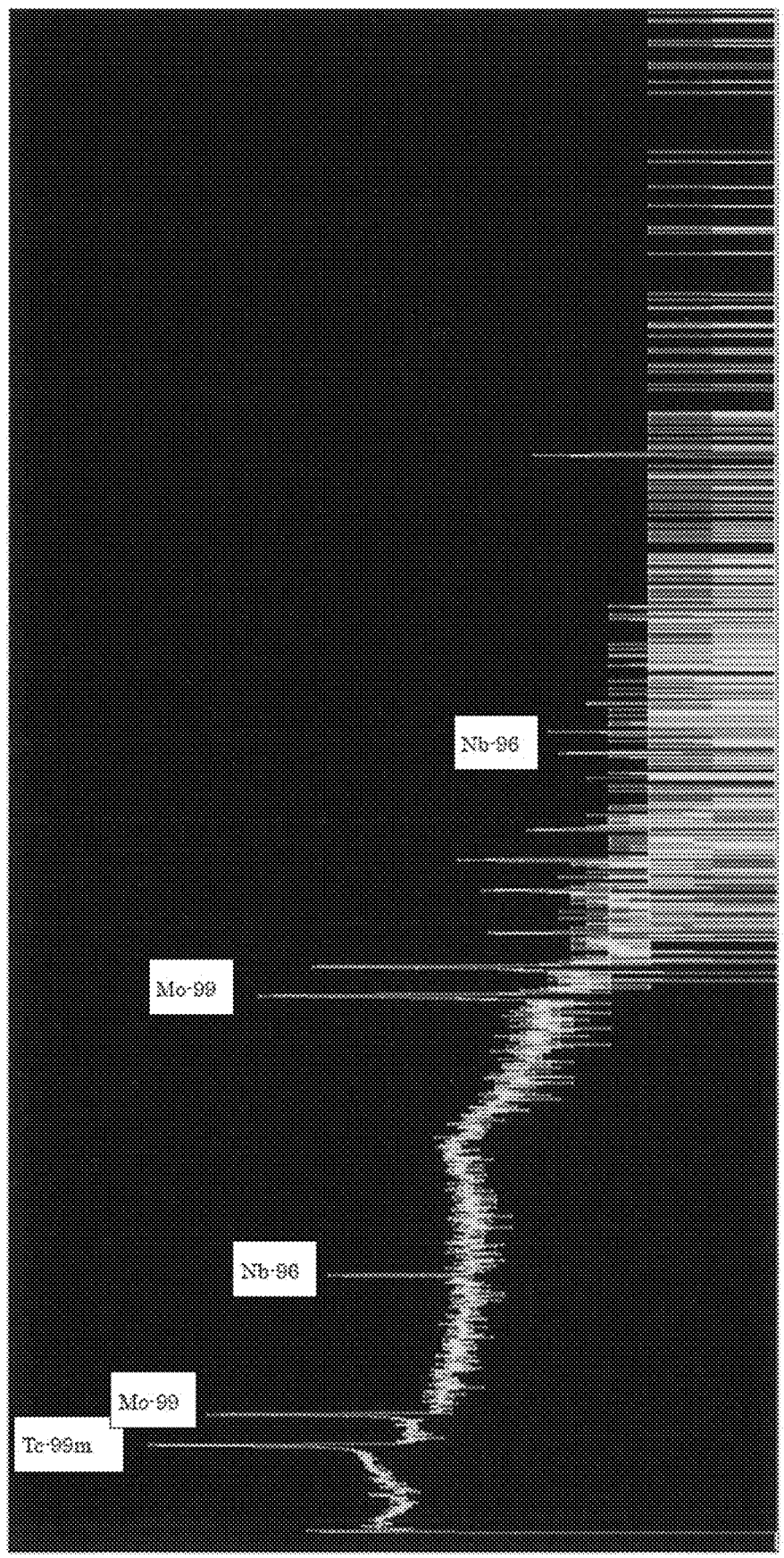
[Fig. 6]

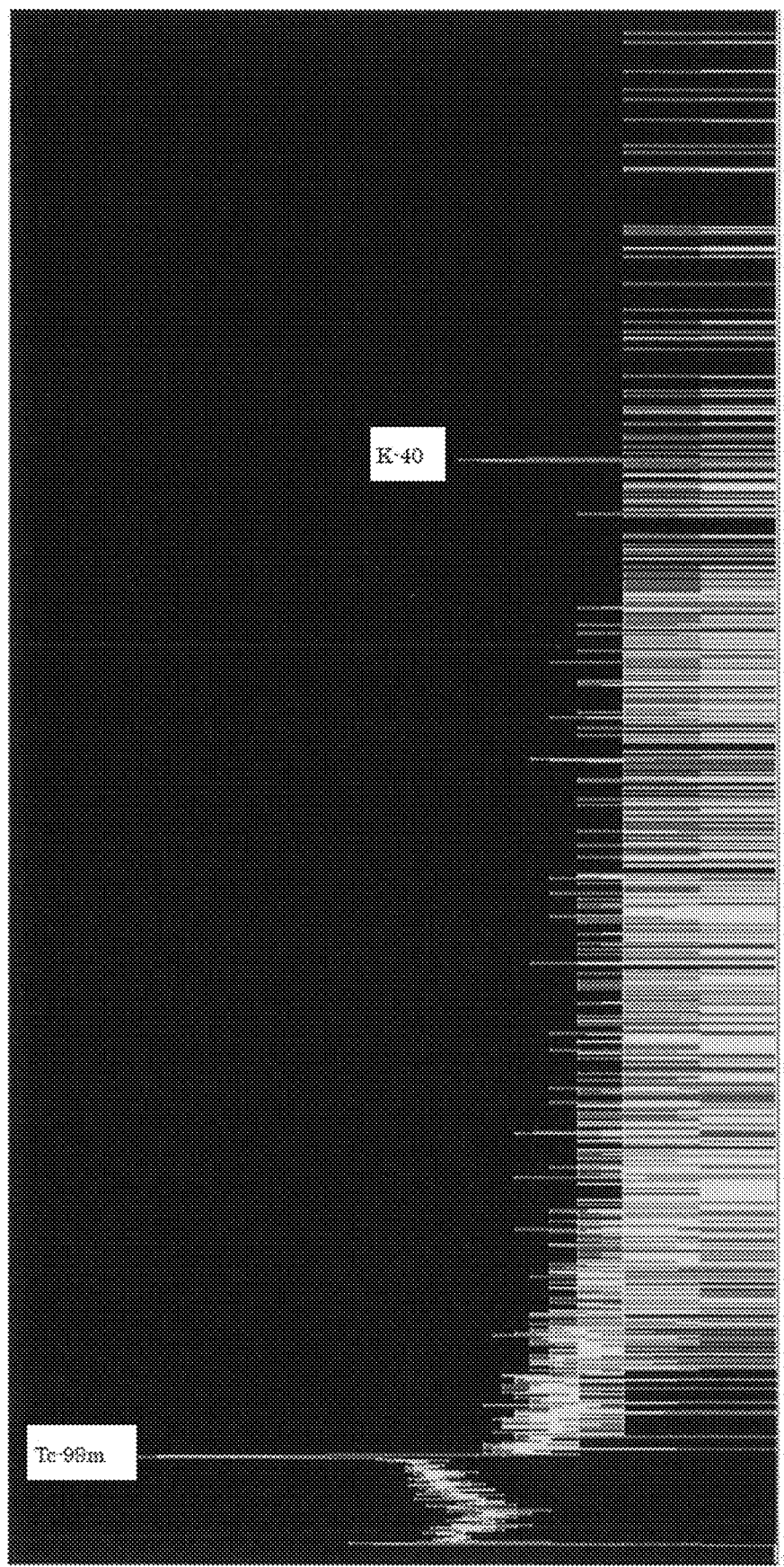
[Fig. 7]

TECHNETIUM 99M ISOLATION SYSTEM AND TECHNETIUM 99M ISOLATION METHOD

This application is a national phase of International Application No. PCT/JP2020/007936 filed Feb. 27, 2020, which claims priority to Japanese Patent Application No. 2019-043911 filed Mar. 11, 2019, in the Japan Patent Office, which are hereby incorporated herein by reference.

TECHNICAL FIELD

The present invention relates to a technetium 99m isolation system and a technetium 99m isolation method.

BACKGROUND ART

As a cancer diagnostic method using gamma ray emitted from a radioisotope (RI), a single photon emission computed tomography (hereinafter referred to as SPECT) scanning is known.

In this SPECT scanning, an inspection of the disease is carried out by administering drugs for nuclear medicine diagnosis (radioisotope-labeled compound, RI-labeled compound) to patients, the drugs composed by binding a radionuclide technetium 99m (Tc-99m) to drugs having a property of easily accumulating in a diseased part, and by detecting gamma ray emitted from the technetium 99m with a radiation detection camera (gamma camera) and imaging them.

The technetium 99m used is in a metastable state and emits 140 keV gamma ray when it isomeric transfers to ground state technetium 99 (Tc99). Gamma ray have a strong ability to penetrate substances, so they pass through the patient's body and are emitted to the outside. In the SPECT scanning, gamma ray due to the isomeric transition of technetium 99m are detected to visualize the diseased part. For example, SPECT scanning can be performed using drugs for nuclear medicine diagnosis with technetium 99m accumulated in a certain blood, and it is possible to perform myocardial blood flow imaging and brain function imaging.

By the way, technetium 99m is a daughter nuclide produced by a beta-decay of a parent nuclide molybdenum 99 (Mo99), and molybdenum 99 is used as raw material for producing technetium-99m. Technetium 99m is extracted by milking using molybdenum 99-technetium 99m generator from the parent nuclide molybdenum 99, and produced.

An elimination half-life of technetium 99m is short with 6.01 hours, while an elimination half-life of molybdenum 99 is 66 hours. Therefore, it is possible to taking-out technetium 99m for about one week with a single purchase of the generator. The generator is a device produced by adsorbing molybdenum 99 on an alumina column, and technetium 99m is eluted by using a physiological saline solution.

Here, since commercially generators have molybdenum 99 adsorbed on an alumina column, there is a problem that samples containing a large amount of molybdenum cannot be processed. Further, since molybdenum 99 produced in an accelerator or a nuclear reactor contains a large amount of molybdenum 100 and molybdenum 98, there is a problem that technetium 99m cannot be efficiently separated and purified by using an alumina column.

Therefore, Patent Literature 1 (WO 2014/057900) discloses an RI isolation device including a nuclide extraction device, a guide line, a pump, an evaporation heater, an exhaust line, and an introduction line. The RI isolation device extracts one nuclide of RI into an organic solvent from water and an organic solvent contained in the RI including the parent nuclide and the daughter nuclide. The guide line guides the organic solvent extracting the one nuclide of RI from the nuclide extractor to the evaporation/elution tank. The pump sends the organic solvent to the guide line. The evaporation heater evaporates the organic solvent guided to the evaporation/elution tank. The exhaust line discharges the evaporated organic solvent from the evaporation/elution tank. The introduction line introduces elution liquid into the evaporation/elution tank. As a result, it is possible to extract one nuclide into the organic solvent, to send to the evaporation/elution tank, to take the one nuclide out by evaporation to dryness, and to continuously perform a work of eluting the other nuclide. Therefore, it is possible to efficiently isolate a large amount of RI.

Nonpatent literature 1 (R. E. BOYD, "Technetium-99m Generators—The Available Options", International Journal of Applied Radiation and Isotopes, 1982, Vol. 33, pp. 801-809) discloses a method of separating and purifying technetium 99m. The method air-bubbles an aqueous sodium hydroxide solution containing molybdenum 99 and technetium 99m under an environment of 95 degrees Celsius, adds methyl ethyl ketone, extracts technetium 99m into methyl ethyl ketone by stirring by bubbling, and separates this extract from the aqueous phase. Then, the method removes molybdenum 99 in the methyl ethyl ketone with a small alumina column, moves to an evaporative vessel, evaporates and dries the methyl ethyl ketone, dissolves the remaining technetium 99m in a physiological saline solution, separates and purifies the technetium 99m.

CITATION LIST

Patent Literature 1

[Patent Literature 1]
WO 2014/057900

Nonpatent Literature

[Nonpatent Literature 1]
R. E. BOYD, "Technetium-99m Generators—The Available Options", International Journal of Applied Radiation and Isotopes, 1982, Vol. 33, pp. 801-809

SUMMARY OF INVENTION

Technical Problem

As described above, since the elimination half-life of technetium 99m is 6.01 hours, it is required to separate and purify technetium 99m produced from molybdenum 99 with high purity and as soon as possible.

In the technique described in Patent Literature 1 described above, stirring and heating are combined when one of the RI nuclides (technetium 99m) is extracted into the organic solvent. However, even with these combinations, there is a problem that it takes time to extract technetium 99m.

In the technique described in Nonpatent Literature 1 described above, the method air-bubbles the aqueous sodium hydroxide solution in the environment of 95 degrees Celsius, adds methyl ethyl ketone and extracts technetium 99m from methyl ethyl ketone. Therefore, there is a problem that it is dangerous due to the low boiling point of methyl ethyl ketone in the environment of 95 degrees Celsius. And, it is also unclear how long it will take to extract technetium 99m.

Accordingly, the present invention was created as a solution for the problems and aims at providing a technetium 99m isolation system and a technetium 99m isolation method that can isolate technetium 99m with high purity and rapidly.

Solution to Problem

A technetium 99m isolation system in the present invention includes an initial introduction control part, a micro-mixing control part, a separation control part, a taking-out introduction control part, an evaporation control part, and an elution control part. The initial introduction control part introduces an aqueous solution containing molybdenum 99 and technetium 99m, and an organic solvent being capable of dissolving the technetium 99m into an extraction tank. The micro-mixing control part micro-mixes the aqueous solution and the organic solvent by heating and stirring a mixed solution of the aqueous solution and the organic solvent introduced into the extraction tank with a heater, while applying ultrasonic to the mixed solution. The separation control part separates the mixed solution micro-mixed into two phases of aqueous solution and an organic solvent. The taking-out introduction control part passes the organic solvent separated into two phases through an adsorption column be capable of adsorbing molybdenum 99 and introduces the organic solvent into an evaporation elution tank. The evaporation control part evaporates the organic solvent and leaves residue by reducing pressure inside the evaporation elution tank and heating the organic solvent introduced into the evaporation elution tank with a heater, while applying ultrasonic to the organic solvent. The elution control part introduces a physiological saline solution into the residue and elutes technetium 99m into the physiological saline solution from the residue.

A technetium 99m isolation method in the present invention includes an initial introduction control step, a micro-mixing control step, a separation control step, a taking-out introduction control step, an evaporation control step, and an elution control step, like each part of the technetium 99m isolation system.

Advantageous Effects of Invention

According to the present invention, the present invention can isolate technetium 99m with high purity and rapidly.

BRIEF DESCRIPTION OF DRAWINGS

FIG. 1 is a conceptual diagram of a technetium 99m isolation system according to the present invention.
FIG. 2 is a flowchart indicating execution steps of a technetium 99m isolation method according to the present invention.
FIG. 3 is a conceptual diagram from S102 to S104 according to the present invention.
FIG. 4 is a conceptual diagram from S105 to S107 according to the present invention.
FIG. 5 is a front photograph of a technetium 99m isolation system according to an embodiment.
FIG. 6 is an example of a gamma ray spectrum of an aqueous sodium hydroxide solution containing molybdenum 99 and technetium 99m according to an embodiment.
FIG. 7 is an example of a gamma ray spectrum of methyl ethyl ketone according to an embodiment.

DESCRIPTION OF EMBODIMENTS

The preferred embodiments of the present invention will be explained below according to the attached drawings; thereby the present invention will be clearly understood. The embodiments below are examples materializing the present invention, and do not limit the technical scope of the present invention.

As shown in FIG. 1, a technetium 99m isolation system 1 according to the embodiment of the present invention includes an initial introduction control part 10, a micro-mixing control part 11, a separation control part 12, a taking-out introduction control part 13, an evaporation control part 14, and an elution control part 15.

The initial introduction control part 10 introduces an aqueous solution W containing molybdenum 99 (Mo99) and technetium 99m (Tc99m), and an organic solvent O being capable of dissolving the technetium 99m into an extraction tank 20. The micro-mixing control part 11 micro-mixes the aqueous solution W and the organic solvent O by heating and stirring a mixed solution M of the aqueous solution W and the organic solvent O introduced into the extraction tank 20 with a heater H1, while applying ultrasonic (ultrasonic wave) U to the mixed solution M.

The separation control part 12 separates the mixed solution M micro-mixed into two phases of aqueous solution W and an organic solvent O. The taking-out introduction control part 13 passes the organic solvent O separated into two phases through an adsorption column 13a be capable of adsorbing molybdenum 99 and introduces the organic solvent O into an evaporation elution tank 21.

The evaporation control part 14 evaporates the organic solvent O and leaves residue R by reducing pressure (decompressing, depressurizing) inside the evaporation elution tank 21 and heating the organic solvent O introduced into the evaporation elution tank 21 with a heater H2, while applying ultrasonic U to the organic solvent O. The elution control part 15 introduces a physiological saline solution S into the residue R and elutes technetium 99m into the physiological saline solution S from the residue R.

Therefore, it is possible to isolate technetium 99m with high purity and rapidly. That is, the present invention micro-mixes the aqueous solution W and the organic solvent O with each other by applying the ultrasonic U in addition to heating and stirring to the aqueous solution W and the organic solvent O in the extraction tank 20, and increases a surface area of an interface between the aqueous solution W and the organic solvent O dramatically. In particular, due to the micro-mixing of the aqueous solution W and the organic solvent O, the droplets of the organic solvent O are finely dispersed in the aqueous solution W, or the droplets of the aqueous solution W are finely dispersed in the organic solvent O (bubbling).

Then, in this state, an extraction equilibrium speed (dissolution equilibrium speed) of technetium 99m for the organic solvent O becomes remarkably high, and the technetium 99m generated from the beta-decay of technetium 99m and molybdenum 99 already existing in the aqueous solution W immediately shifts to organic solvent O. Therefore, the extraction equilibrium of technetium 99m for the organic solvent O can be accelerated as compared with ordinary stirring alone, heating alone, or a combination thereof, and a time to reach the extraction equilibrium can be dramatically shortened.

Further, the present invention introduces the separated organic solvent O into the evaporation elution tank 21 via the adsorption column 13a. Therefore, the adsorption column 13a adsorbs molybdenum 99 or the like in the organic solvent O, so that a purity of technetium 99m in the organic solvent O supplied to the evaporation elution tank 21 can be increased.

Then, the present invention applies ultrasonic U to the organic solvent O containing technetium 99m in the evaporation elution tank 21 in addition to decompression and heating, so that a contact area between the organic solvent O and the air is expanded and accelerates a volatilization speed of the organic solvent O. As a result, a time required for evaporation of the organic solvent O can be dramatically shortened, a total treatment time can be significantly shortened, and the residue R containing technetium 99m of the target can be quickly obtained.

Further, the technetium 99m of the residue R remaining after the evaporation of the organic solvent O has a purity of almost 100%, and if the physiological saline solution S is supplied to the residue R, the technetium 99m from the residue R can be easily eluted from the physiological saline solution S. The physiological saline solution S eluted technetium 99m can be immediately used for SPECT scanning and the like.

In particular, since the elimination half-life of technetium 99m is short with about 6 hours, the present invention can obtain only a target of the technetium 99m with high purity and in a short time. Therefore, an availability of the technetium 99m can be greatly expanded. In addition, shortening the treatment time can reduce a risk of radiation exposure to workers and improve safety.

Here, a kind of the aqueous solution W containing molybdenum 99 and technetium 99m is not particularly limited. It is appropriately set according to the kind of molybdenum 99. For example, when molybdenum 99 is an oxide, an alkaline aqueous solution W is set, and when molybdenum 99 is a metal, an acidic aqueous solution W is set. Examples of the alkaline aqueous solution W include a sodium hydroxide aqueous solution containing molybdenum 99 and technetium 99m. Further, a pH of the sodium hydroxide aqueous solution is not particularly limited. For example, a strong basic sodium hydroxide aqueous solution having a pH of 10 to 14 can be mentioned.

Further, the kind of the organic solvent O be capable of dissolving technetium 99m is not particularly limited. For example, a ketone, an alcohol, etc. that can be dissolved in an aqueous solution can be mentioned. Specifically, methyl ethyl ketone can be adopted.

Further, a ratio of the aqueous solution W introduced into the extraction tank 20 and the organic solvent O is not particularly limited. For example, a weight ratio between the aqueous solution W and the organic solvent O is preferably in the range of 6:4 to 3:7, more preferably in the range of 5:5 to 4:6, most preferable in the range of 5:5. By adopting such the weight ratio, it is possible to shift technetium 99m in the aqueous solution W to the organic solvent O rapidly. In the present invention, by combining stirring, heating and ultrasonic, when the weight ratio between the aqueous solution W and the organic solvent O is 5:5 to 4:6, technetium 99m in the aqueous solution is shifted to the organic solvent by 90% or more.

Further, a method of introducing the aqueous solution W of the initial introduction control part 10 is not particularly limited. For example, as shown in FIG. 1, an aqueous solution line 10a is installed above the extraction tank 20, when the aqueous solution W introduction is started, the initial introduction control part 10 introduces the aqueous solution W into the extraction tank 20 by opening an opening/closing valve 10b of the aqueous solution line 10a. When the introduction of the predetermined amount of the aqueous solution W is completed, the initial introduction control part 10 closes the opening/closing valve 10b of the aqueous solution line 10a. A method for introducing the organic solvent O is also the same. The organic solvent line 10c is installed above the extraction tank 20, and when the introduction is started, the initial introduction control part 10 introduces the organic solvent O into the extraction tank 20 by opening an opening/closing valve 10d of the organic solvent line 10c. When the introduction of the predetermined amount of the organic solvent O is completed, the initial introduction control part 10 closes the opening/closing valve 10d of the organic solvent line 10c.

Further, a stirring method of the micro-mixing control part 11 is not particularly limited. For example, as shown in FIG. 1, the micro-mixing control part 11 can stir by using a rotating a stirring blade 11a in a rotary stirring method. Further, when the extraction tank 20 has a structure capable of vibrating up and down, a shaker type stirring method of up and down vibration may be used.

Further, in a type of the rotary stirring method, the stirring time is not particularly limited. For example, considering a total amount of the aqueous solution W and the organic solvent O (total amount of the mixed solution M) and the elimination half-life of technetium 99m, the stirring time is preferably in the range of 10 minutes to 40 minutes, and is preferably in the range of 20 minutes to 30 minutes. Further, a rotation speed of the stirring blade 11a is not particularly limited. For example, considering the certainty of micro-mixing, the rotation speed of the stirring blade 11a is preferably in the range of 100 rpm to 1500 rpm, and more preferably in the range of 300 rpm to 1000 rpm.

Further, a heating method of the micro-mixing control part 11 is not particularly limited. For example, as shown in FIG. 1, a heating method in which a coil-type heater H1 is wound around the extraction tank 20 can be mentioned. Further, a heating temperature of the heater H1 is not particularly limited. For example, the heating temperature of the heater H1 may be a temperature equal to or lower than the boiling point of the organic solvent O and up to a value obtained by subtracting a predetermined subtraction value (for example, 20 degrees) from the boiling point of the organic solvent O. As a result, it is possible to reliably prevent bumping of the organic solvent O. Specifically, considering the boiling point of the organic solvent O, the heating temperature of the heater H1 is preferably in the range of 10 degrees to 90 degrees, more preferably in the range of 20 degrees to 80 degrees, and more preferably in the range of 40 degrees to 80 degrees.

Further, a method of applying ultrasonic U of the micro-mixing control part 11 is not particularly limited. For example, as shown in FIG. 1, an ultrasonic generator 11b is installed around the extraction tank 20, and the micro-mixing control part 11 applies ultrasonic U generated the ultrasonic generator 11b to the mixed solution M in the extraction tank 20 by driving the ultrasonic generator 11b. Further, a frequency of the ultrasonic U is not particularly limited. For example, considering the micro-mixing of the aqueous solution W and the organic solvent O, the frequency of the ultrasonic U is preferably in the range of 10 kHz to 50 kHz, and more preferably in the range of 20 kHz to 40 kHz.

Further, a separation method of the separation control part 12 is not particularly limited. For example, a method of leaving the mixed solution micro-mixed for a predetermined time in order to separate the mixed solution into two phases, a method of centrifuging the mixed solution micro-mixed and separating the mixed solution into two phases, and the like can be mentioned.

Further, a leaving method of the separation control part 12 is not particularly limited. For example, the separation control part 12 stops all the processes such as stirring, heating, and applying ultrasonic to the mixed solution M micro-mixed, and leaves the mixed solution M naturally. In addition, a leaving time is not particularly limited. For example, considering a time required for the two phases separation of the aqueous solution W and the organic solvent O, the leaving time is preferably in the range of 2 minutes to 10 minutes, and more preferably 5 minutes.

Further, a centrifuging method of the separation control part 12 is not particularly limited. For example, the extraction tank 20 is configured to be centrifugable, and the mixed solution after micro-mixing is centrifuged in the extraction tank 20, or the mixed solution after micro-mixing is taken out from the extraction tank 20 and put into a centrifuge, and it is possible to drive a centrifuge to separate into two phases.

Further, a taking-out method and an introduction method of the taking-out introduction control part 13 are appropriately set according to the separation method of the separation control part 12. When the separation control part 12 separates the mixed solution into two phases by leaving the mixed solution in the extraction tank 20, for example, as shown in FIG. 1, an inlet of a taking-out line 13*b* is installed at the position where the organic solvent O separated into the two phases stays in the extraction tank 20, an outlet of the taking-out line 13*b* is installed at the position above the evaporation elution tank 21, in an opening/closing valve 13*c* in a closed state of the taking-out line 13*b*, when the leaving of the mixed solution M is completed, the taking-out introduction control part 13 opens the opening/closing valve 13*c* of the taking-out line 13*b* so that the organic solvent O in the extraction tank 20 passes through the taking-out line 13*b* and is introduced into the evaporation elution tank 21. Then, when the taking-out of the organic solvent O is completed, the taking-out introduction control part 13 closes the opening/closing valve 13*c* of the taking-out line 13*b*.

In the above case, an adsorption column 13*a* is installed on a downstream side of the opening/closing valve 13*c* of the taking-out line 13*b*. Examples of the adsorbent for the adsorption column 13*a* include alumina, silica, zeolite, activated carbon and the like. Further, the taking-out line 13*b* may be appropriately provided with a liquid feed pump for sucking the organic solvent O and the like.

When the separation control part 12 separates the mixed solution into two phases by a centrifuge, the taking-out introduction control part 13 can suck and take out a supernatant solution in the centrifuge after centrifugation by the taking-out line 13*b* and introduce the supernatant solution into the evaporation elution tank 21 via the adsorption column 13*a*.

Further, the extraction tank 20 is provided with a leak line 20*a* for ejecting the separated aqueous solution W to the outside, and an ejecting the aqueous solution W is controlled by opening and closing an opening/closing valve 20*b* of the leak line 20*a*.

Further, a decompression method of the evaporation control part 14 is not particularly limited. For example, as shown in FIG. 1, the evaporation control part 14 drives a discharge pump 14*a* provided above the evaporation elution tank 21, discharges the air in the evaporation elution tank 21 to the outside, and reduces pressure inside the evaporation elution tank 21 to pressure lower than the atmospheric pressure by a predetermined decompression value. Further, the decompression value is not particularly limited. For example, considering an improvement of an evaporation rate of the organic solvent O and the safety, the decompression value is preferably in the range of 5% to 20% of the atmospheric pressure, and more preferably 10% of the atmospheric pressure.

Further, a heating method of the evaporation control part 14 is not particularly limited. For example, as shown in FIG. 1, a heating method in which a coil-type heater H2 is wound around the evaporation elution tank 21 can be mentioned. Further, a heating temperature of the heater H2 is not particularly limited. For example, the heating temperature of the heater H2 may be a temperature equal to or lower than the boiling point of the organic solvent O and up to a value obtained by subtracting a predetermined subtraction value (for example, 20 degrees) from the boiling point of the organic solvent O. As a result, it is possible to reliably prevent bumping of the organic solvent O. Specifically, considering the boiling point of the organic solvent O, the heating temperature of the heater H2 is preferably in the range of 20 degrees to 80 degrees, and more preferably in the range of 40 degrees to 80 degrees.

Further, a method of applying ultrasonic U of the evaporation control part 14 is not particularly limited. For example, as shown in FIG. 1, an ultrasonic generator 14*b* is installed around the evaporation elution tank 21, and the evaporation control part 14 applies ultrasonic U generated the ultrasonic generator 14*b* to the organic solvent O in the evaporation elution tank 21 by driving the ultrasonic generator 14*b*. Further, a frequency of the ultrasonic U is not particularly limited. For example, considering an evaporation promotion of the organic solvent O, the frequency of the ultrasonic U is preferably in the range of 10 kHz to 50 kHz, and more preferably in the range of 20 kHz to 40 kHz.

Further, an introducing method of the elution control part 15 is not particularly limited. For example, as shown in FIG. 1, a physiological saline solution line 15*a* is installed above the evaporation elution tank 21, and when the evaporation of the organic solvent O is completed, the elution control part 15 supplies the physiological saline solution S to the inside of the evaporation elution tank 21 by opening an opening/closing valve 15*b* of the physiological saline solution line 15*a*. When the introduction of the predetermined amount of the physiological saline solution S is completed, the elution control part 15 closes the opening/closing valve 15*b* of the physiological saline solution line 15*a*.

Further, an elution method of the elution control part 15 is not particularly limited. For example, after introducing the physiological saline solution S into the residue R, the elution control part 15 preferably heats the physiological saline solution S containing the residue R with the heater H2. Therefore, it possible to quickly elute technetium 99m of the residue R into the physiological saline solution S. A heating temperature of the heater H2 is not particularly limited. For example, the heating temperature of the heater H2 is preferably in the range of 30 degrees to 60 degrees, and more preferably in the range of 40 degrees to 50 degrees. Further, the elution control part 15 may apply ultrasonic U to the physiological saline solution S containing the residue R after introducing the physiological saline solution S into the residue R.

When the elution control part 15 completes the elution of technetium 99m into the physiological saline solution S, the elution control part 15 ejects the physiological saline solution S eluting the technetium 99m from the evaporation elution tank 21 and collects the physiological saline solution S containing the technetium 99m.

Here, a collection method of the elution control part 15 is not particularly limited. For example, as shown in FIG. 1, a collection line 15*c* is installed below the evaporation elution tank 21, and when the elution of technetium 99m is completed, the elution control part 15 ejects the physiological saline solution S inside the evaporation elution tank 21 to the outside via the collection line 15c by opening an opening/closing valve 15d of the collection line 15c. When the ejecting of the predetermined amount of the physiological saline S is completed, the elution control part 15 closes the opening/closing valve 15d of the collection line 15c.

By the way, a method for producing the aqueous solution W to be introduced into the extraction tank 20 is not particularly limited. For example, by connecting a production control part 16 for producing the aqueous solution W to the extraction tank 20 via the aqueous solution line 10a, the aqueous solution W may be continuously introduced into the extraction tank 20.

Here, a configuration of the production control part 16 is not particularly limited. For example, as shown in FIG. 1, since a neutron beam R generated in an accelerator or a reactor is irradiated to a molybdenum oxide 16b of a storage container 16a, or a molybdenum metal sintered body 16b is irradiated with a gamma ray R, molybdenum 99 and technetium 99m are produced, an aqueous solution W is introduced into the molybdenum 99 and technetium 99m produced, and the aqueous solution W containing the molybdenum 99 and the technetium 99m is produced. When the neutron beam R is used, the molybdenum 99 generation reaction is a 98Mo (n, γ) 99Mo reaction, and when the gamma ray R is used, the molybdenum 99 generation reaction is a 100Mo (γ, n) 99Mo reaction. Then, the aqueous solution W produced by the production control part 16 is introduced into the extraction tank 20 via the aqueous solution line 10a.

Further, the technetium 99m isolation system 1 according to the embodiment of the present invention further may include a drug synthesis control part 17 synthesizing a radioisotope drug containing technetium 99m by chemically reacting technetium 99m contained in the physiological saline solution S with a drug. The drug includes a radiological diagnostic drug that will utilize technetium 99m. The drug synthesis control part 17 may be provided with a heating means or a pressurizing means depending on the kind of the drug. Then, the drug synthesis control part 17 is connected to, for example, the collection line 15c of the evaporation elution tank 21, and the elution control part 15 introduces the physiological saline solution S eluting technetium 99m into the drug synthesis control part 17 by opening an opening/closing valve 15d of the collection line 15c. The drug synthesis control part 17 chemically reacts technetium 99m in the introduced physiological saline solution S with the drug. Then, the drug synthesis control part 17 can easily and quickly obtain a radioisotope drug containing technetium 99m by ejecting the radioisotope drug containing technetium 99m to the outside after the chemical reaction.

Next, an execution steps of a technetium-99m isolation method according to the embodiment of the present invention will be described. First, an operator sets a molybdenum oxide 16b in a production control part 16 of a technetium 99m isolation system 1 at a position in a storage container 16a where radiation R (for example, gamma ray) is irradiated. Then, when the operator activates the technetium-99m isolation system 1, the production control part 16 irradiates the molybdenum oxide 16b with radiation R, and produces molybdenum 99 and technetium 99m by a predetermined molybdenum 99 reaction (for example, 100Mo (γ, n) 99Mo). The production control part 16 supplies an aqueous solution W (for example, aqueous sodium hydroxide solution) to the storage container 16a, and prepares the aqueous solution W containing molybdenum 99 and technetium 99m (FIG. 2: S101).

Next, an initial introduction control part 10 of the technetium-99m isolation system 1 introduces the aqueous solution W containing molybdenum 99 and technetium 99m, and an organic solvent O being capable of dissolving the technetium 99m into an extraction tank 20 (FIG. 2: S102).

Specifically, the initial introduction control part 10 opens an opening/closing valve 10b of an aqueous solution line 10a in the closed state, supplies a predetermined amount of the aqueous solution W to the extraction tank 20. The initial introduction control part 10 opens an opening/closing valve 10d of an organic solvent line 10c in the closed state, and supplies a predetermined amount of the organic solvent O to the extraction tank 20. At this time, the initial introduction control part 10 introduces the aqueous solution W and the organic solvent O so that a ratio between the aqueous solution W and the organic solvent O sets to a predetermined value (for example, a weight ratio between the aqueous solution W and the organic solvent O is 5:5).

Then, as shown in FIG. 3, the aqueous solution W and the organic solvent O are basically not mixed by simply introducing the aqueous solution W and the organic solvent O into the extraction tank 20. Therefore, the mixed solution M is separated into two phases in which the organic solvent O having a specific gravity smaller than a specific gravity of the aqueous solution W is on the upper side due to the respective specific gravities.

Then, when the introduction of the initial introduction control part 10 is completed, the micro-mixing control part 11 of the technetium-99m isolation system 1 micro-mixes the aqueous solution W and the organic solvent O by heating and stirring the mixed solution M of the aqueous solution W and the organic solvent O introduced into the extraction tank 20 with a heater H1, while applying ultrasonic U to the mixed solution M (FIG. 2: S103).

Specifically, the micro-mixing control part 11 rotates a stirring blade 11a in the extraction tank 20 at a predetermined rotation speed (for example, 500 rpm), supplies electric power to the heater H1, adds a heat of the heater H1 to the mixed solution M in the extraction tank 20, and heats a temperature of the mixed solution M to a predetermined heating temperature (for example, 60 degrees). The micro-mixing control part 11 activates an ultrasonic generator 11b at the same time as stirring and heating, and applies ultrasonic U having a predetermined frequency (for example, 36 kHz) to the mixed solution M in the extraction tank 20.

Then, as shown in FIG. 3, the two phases separated aqueous solution W and the organic solvent O are finely mixed with each other by stirring, heating, and applying ultrasonic U, the droplets of the organic solvent O are finely dispersed in the aqueous solution W, or the droplets of the aqueous solution W are finely dispersed in the organic solvent O. As a result, molybdenum 99 existing in the aqueous solution W immediately shifts to organic solvent O.

Then, when the micro-mixing control part 11 stirs, heats, and applies ultrasonic U for a predetermined time (for example, 20 minutes), a separation control part 12 of the technetium 99m isolation system 1 separates the mixed solution M micro-mixed into two phases of aqueous solution W and the organic solvent O (FIG. 2: S104).

Specifically, the separation control part 12 stops the stirring, heating, and applying ultrasonic U by the micro-mixing control part 11 for a predetermined time (for example, 5 minutes), and leaves the mixed liquid M naturally. Then, as shown in FIG. 3, since the micro-mixed aqueous solution W and the organic solvent O are basically not mixed, the mixed solution M separates into two phases in which the organic solvent O is again above the aqueous solution W due to their respective specific gravities.

Then, when the separation control part 12 completes the leaving, the taking-out introduction control part 13 of the technetium 99m isolation system 1 takes out the organic solvent O separated into two phases and introduces the organic solvent O into the evaporation elution tank 21 (FIG. 2: FIG. S105).

Specifically, the taking-out introduction control part 13 opens an opening/closing valve 13b of a taking-out line 13a, and passes the organic solvent O of the extraction tank 20 through the taking-out line 13a, and supplies to the evaporation elution tank 21. At this time, the taking-out introduction control part 13 supplies a predetermined amount of the organic solvent O to the evaporation elution tank 21 by adjusting the opening/closing valve 13b of the taking-out line 13a.

Then, as shown in FIG. 4, the organic solvent O containing technetium 99m is stored inside the evaporation elution tank 21.

Then, when the taking-out introduction control part 13 completes the introduction, the evaporation control part 14 of the technetium 99m isolation system 1 evaporates the organic solvent O and leaves residue R by reducing pressure inside the evaporation elution tank 21 and heating the organic solvent O introduced into the evaporation elution tank 21 with a heater H2, while applying ultrasonic U to the organic solvent O (FIG. 2: S106).

Specifically, the evaporation control part 14 drives a discharge pump 14a, reduces the pressure inside the evaporation elution tank 21 by a predetermined decompression value (for example, 10% of the atmospheric pressure), supplies power to the heater H2, adds a heat of the heater H2 to the organic solvent O in the evaporation extraction tank 21, and heats a temperature of the organic solvent O to a predetermined heating temperature (for example, 60 degrees). Then, the evaporation control part 14 activates an ultrasonic generator 14b at the same time as decompressing and heating, and applies ultrasonic U having a predetermined frequency (for example, 36 kHz) to the organic solvent O in the evaporation elution tank 21.

Then, as shown in FIG. 4, the organic solvent O containing technetium 99m evaporates remarkably inside the evaporation elution tank 21, and technetium 99m in the organic solvent O appears as a residue R. The evaporation control part 14 reduces pressure, heats, and applies ultrasonic U for a predetermined time (for example, 15 minutes) until the organic solvent O inside the evaporation elution tank 21 is almost evaporated.

Then, when the evaporation control part 14 completes the evaporation, the elution control part 15 of the technetium 99m isolation system 1 introduces an physiological saline solution S into the residue R and elutes technetium 99m into the physiological saline solution S from the residue R (FIG. 2: S107).

Specifically, the elution control part 15 supplies the physiological saline solution S to the inside of the evaporation elution tank 21 by opening an opening/closing valve 15b of a physiological saline solution line 15a in the closed state.

Then, as shown in FIG. 4, the residue R containing technetium 99m is eluted in the physiological saline solution S, and the physiological saline solution S contains technetium 99m.

Then, when the elution control part 15 completes the introduction, the physiological saline solution S containing technetium 99m is ejected from the evaporation elution tank 21, and is collected (FIG. 2: S108).

Specifically, the elution control part 15 ejects the physiological saline solution S containing technetium 99m to the outside via a collection line 15c by opening an opening/closing valve 15d of the collection line 15c in the closed state. For example, the operator prepares a collection bottle at an outlet of the collection line 15c, puts the physiological saline solution S ejecting from the collection line 15c into the collection bottle, and collects the physiological saline solution S containing of the technetium 99m. The physiological saline solution S containing the technetium 99m can be directly used, for example, for SPECT scanning and the like.

By the way, after collecting the physiological saline solution S containing technetium 99m, the aqueous solution W containing molybdenum 99 remains in the extraction tank 20. Since molybdenum 99 grows to technetium 99m due to beta-decay, returning to S102, the initial introduction control part 10 introduces a new organic solvent O into the extraction tank 20 (FIG. 2: S102), and it is possible to extract technetium 99m by reusing the molybdenum 99 remaining in the aqueous solution W. Similar to the above, the initial introduction control part 10 introduces organic solvent O so that a ratio between the aqueous solution W and the organic solvent O sets to a predetermined value (a weight ratio between the aqueous solution W and the organic solvent O is 5:5). After that, S103 to S108 can be executed, and the physiological saline solution S containing technetium 99m can be collected again.

In the embodiment of the present invention, the technetium 99m isolation system 1 includes the initial introduction control part 10, the micro-mixing control part 11, the separation control part 12, the taking-out introduction control part 13, the evaporation control part 14, the elution control part 15, and the production control part 16, is comprised to automatically perform the steps from the production of the aqueous solution to the collection of the physiological saline solution S containing of technetium 99m. Even if a part is manually comprised, it still has the effects of the present invention.

Further, in the embodiment of the present invention, the technetium 99m isolation system 1 is comprised to include each part, but it is also possible to provide a step of executing each part as the technetium 99m isolation method of the present invention. Further, a program for realizing each part may be stored in a storage medium, and the storage medium may be provided.

EXAMPLES

Hereinafter, the present invention will be explained below according to Examples and the like, but does not limit by there.

First, based on FIG. 1, a technetium 99m isolation system 1 according to Example was prepared. As shown in FIG. 5, an extraction tank 20 can store about 1 L of solution, and an evaporation elution tank 21 can store about 500 mL of solution. A stirring blade was built in the extraction tank 20, and a coil-type heater was installed around the extraction tank 20. A coil-type heater was installed around the evaporation elution tank 21. Each part of the technetium 99m isolation system 1 was built in a control device provided below the extraction tank 20 and the evaporation elution tank 21.

An aqueous solution W containing molybdenum 99 and technetium 99m is produced by 100Mo (γ, n) 99Mo reaction in a radiation facility. 500 mL of 4M (mol/m3) an aqueous sodium hydroxide solution containing technetium 99m was prepared as the aqueous solution W. Further, 500 mL of methyl ethyl ketone (boiling point, about 80 degrees) was prepared as organic solvent O. Then, the aqueous sodium hydroxide solution and the methyl ethyl ketone were introduced into the extraction tank 20 using an aqueous solution line and an organic solvent line. A weight ratio of the aqueous solution W and the organic solvent O was 5:5.

Here, a gamma ray spectrum of the aqueous sodium hydroxide solution containing molybdenum 99 and technetium 99m was measured. As shown in FIG. 6, peaks of molybdenum 99 and a peak of technetium 99m are observed, and it is understood that the aqueous sodium hydroxide solution contains molybdenum 99 and technetium 99m. In addition, peaks of radioactive isotope niobium 96 (Nb96) were also observed as an impurity.

Next, in the extraction tank 20 into which the aqueous sodium hydroxide solution and the methyl ethyl ketone were introduced, stirring, heating and applying ultrasonic carried out for about 20 minutes. A rotation speed of the stirring blade was about 500 rpm, a heating temperature of a heater was about 60 degrees, and a frequency of the ultrasonic was 36 kHz. The heating temperature of the heater was set to a value obtained by subtracting a predetermined subtraction value (20 degrees) from the boiling point (80 degrees) of methyl ethyl ketone.

When the stirring, heating, and applying ultrasonic were completed, all were stopped, the aqueous sodium hydroxide solution and the methyl ethyl ketone were left naturally for about 5 minutes, and were separate into two phases. Then, using the taking-out line, an upper methyl ethyl ketone is sucked up, molybdenum 99 in the methyl ethyl ketone are adsorbed via an adsorption column 13*a*, and the methyl ethyl ketone containing technetium 99m ejected from the adsorption column 13*a* is introduced into an evaporation elution tank 21.

Further, in the evaporation elution tank 21 into which the methyl ethyl ketone was introduced, decompression, heating and applying ultrasonic were carried out for about 15 minutes. The decompression value was 10% of the atmospheric pressure, the heating temperature of the heater was about 60 degrees, and the frequency of the ultrasonic waves was 36 kHz. The heating temperature of the heater was set to a value obtained by subtracting a predetermined subtraction value (20 degrees) from the boiling point (80 degrees) of methyl ethyl ketone in the same manner as described above.

When the decompression, heating and applying ultrasonic were completed, all methyl ethyl ketone was volatilized, and a residue remained only. A physiological saline solution was introduced into the residue, the residue was eluted with the physiological saline solution, and the physiological saline solution was collected using a collection line.

Here, the gamma ray spectrum of the methyl ethyl ketone in the evaporation elution tank 21 was measured. As shown in FIG. 7, a peak of technetium 99m and a peak of potassium 40 (K40) were observed, but a peak of molybdenum 99 and a peak of niobium 96 that originally existed were not observed. The peak of potassium 40 has also been measured, that is a naturally occurring isotope of potassium. Therefore, it is shown that only technetium 99m could be substantially extracted by the above-mentioned operation. Therefore, technetium 99m could be isolated with high purity (almost 100%). A yield of technetium 99m was represented by a radioactivity of technetium 99m in an organic solvent/a radioactivity of technetium 99m in an aqueous sodium hydroxide solution, and a value of 90% or more was obtained. Technetium 99m could be isolated in high yield.

Calculating a treatment time, for 1 L of the mixed solution, by adding 20 minutes of stirring/heating/applying ultrasonic, 5 minutes of leaving, and 15 minutes of decompressing/heating/applying ultrasonic, the treatment time was about 40 minutes.

On the other hand, in the technetium 99m isolation system 1 according to Example, the two ultrasonic generators were removed from the extraction tank 20 and the evaporation elution tank 21, respectively, a technetium 99m isolation system according to Comparative example was comprised, and the same amount of the above-mentioned sodium hydroxide aqueous solution and the above-mentioned methyl ethyl ketone were stirred and heated, left, and decompressed and heated.

Then, when ultrasonic application was not used, 1 L of the mixed solution is treated for about 60 minutes by adding 30 minutes of stirring/heating, 5 minutes of leaving, and 25 minutes of decompressing/heating. That is, the treatment time in Example could be shortened by (60 minutes-40 minutes)/60 minutes*100=33.3%. By optimizing conditions of Example, the yield of technetium 99m can be brought close to almost 100%, and the treatment time can be further shortened.

Therefore, it was clarified that Example can perform the isolation treatment of technetium 99m with high purity and rapidly.

INDUSTRIAL APPLICABILITY

As described above, the technetium 99m isolation system and the technetium 99m isolation method according to the present invention are useful for producing technetium 99m, a drug for diagnostic nuclear medicine used for SPECT scanning, and are useful for a production of technetium 99m used in various industries such as research use industrial use and food use not limited to medical use. it is effective as the technetium 99m isolation system and the technetium 99m isolation method that can perform the isolation treatment of technetium 99m with high purity and rapidly.

REFERENCE SIGNS LIST

1 Technetium 99m isolation system
10 Initial introduction control part
11 Micro-mixing control part
12 Separation control part
13 Extraction introduction control part
14 Evaporation control part
15 Elution control part
16 Production control part
17 Drug synthesis control part

The invention claimed is:
1. A technetium 99m isolation system comprising:
an initial introduction control part introducing an aqueous solution containing molybdenum 99 and technetium 99m, and an organic solvent being capable of dissolving the technetium 99m into an extraction tank;
a micro-mixing control part micro-mixing the aqueous solution and the organic solvent by heating and stirring a mixed solution of the aqueous solution and the organic solvent introduced into the extraction tank with a heater, while applying ultrasonic to the mixed solution;

a separation control part separating the mixed solution micro-mixed into two phases of aqueous solution and an organic solvent;

a taking-out introduction control part passing the organic solvent separated into two phases through an adsorption column be capable of adsorbing molybdenum 99 and introducing the organic solvent into an evaporation elution tank;

an evaporation control part evaporating the organic solvent and leaving residue by reducing pressure inside the evaporation elution tank and heating the organic solvent introduced into the evaporation elution tank with a heater, while applying ultrasonic to the organic solvent; and an elution control part introduces physiological saline solution into the residue and elutes technetium 99m into the physiological saline solution from the residue; wherein:

the initial introduction control part is configured to introduce the aqueous solution and the organic solvent such that the weight ratio between the aqueous solution and the organic solvent is in the range of 6:4 to 3:7, and the micro-mixing control part is configured such that a heating temperature of the heater heated by the micro-mixing control part is a temperature equal to or lower than the boiling point of the organic solvent and up to a value obtained by subtracting a predetermined subtraction value from the boiling point of the organic solvent, when the micro-mixing control part stirs by rotating a stirring blade, a rotation speed of the stirring blade is in the range of 100 rpm to 1500 rpm, a frequency of the ultrasonic applied by the micro-mixing control part is in the range of 10 kHz to 50 kHz, and the micro-mixing control part increases a surface area of an interface between the aqueous solution and the organic solvent, and in this state an extraction equilibrium speed of technetium 99m for the organic solvent increases, and the technetium 99m generated from the beta-decay of technetium 99m and molybdenum 99 already existing in the aqueous solution immediately shifts to the organic solvent.

2. The technetium 99m isolation system according to claim 1, wherein:

the initial introduction control part is configured to introduce the aqueous solution and the organic solvent such that the weight ratio between the aqueous solution and the organic solvent is in the range of 5:5 to 4:6.

3. The technetium 99m isolation system according to claim 1, wherein:

the organic solvent is a ketone or an alcohol.

4. The technetium 99m isolation system according to claim 1, wherein:

the micro-mixing control part is configured such that the frequency of the ultrasonic applied by the micro-mixing control part is in the range of 20 kHz to 40 kHz.

5. The technetium 99m isolation system according to claim 1, wherein:

the micro-mixing control part is configured such that when the micro-mixing control part stirs by rotating a stirring blade, a rotation speed of the stirring blade is in the range of 300 rpm to 1000 rpm.

6. The technetium 99m isolation system according to claim 1, wherein:

the micro-mixing control part is configured such that when the micro-mixing control part stirs by rotating a stirring blade, a stirring time of the stirring blade is in the range of 20 minutes to 30 minutes.

7. The technetium 99m isolation system according to claim 1, wherein:

the micro-mixing control part is configured such that the heating temperature of the heater heated by the micro-mixing control part is in the range of 10 degrees Celsius to 90 degrees Celsius.

8. The technetium 99m isolation system according to claim 1, wherein:

the micro-mixing control part is configured such that the heating temperature of the heater heated by the micro-mixing control part is in the range of 20 degrees Celsius to 80 degrees Celsius.

9. The technetium 99m isolation system according to claim 1, wherein:

the separation control part is configured to stop the stirring, heating, and applying ultrasonic to the mixed solution, and leave the mixed solution naturally.

10. The technetium 99m isolation system according to claim 9, wherein:

the leaving time is in the range of 2 minutes to 10 minutes.

11. The technetium 99m isolation system according to claim 1, wherein:

the initial introduction control part is configured to introduce the aqueous solution and the organic solvent such that the weight ratio between the aqueous solution and the organic solvent is in the range of 5:5 to 4:6.

12. The technetium 99m isolation system according to claim 1, wherein:

the organic solvent is a methyl ethyl ketone.

13. The technetium 99m isolation system according to claim 1, wherein:

the initial introduction control part is configured to introduce the aqueous solution and the organic solvent such that the weight ratio between the aqueous solution and the organic solvent is in the range of 5:5 to 4:6, and the organic solvent is a methyl ethyl ketone.

14. The technetium 99m isolation system according to claim 1, wherein:

the micro-mixing control part is configured such that when the micro-mixing control part stirs by rotating a stirring blade, a stirring time of the stirring blade is in the range of 10 minutes to 40 minutes.

15. The technetium 99m isolation system according to claim 1, wherein:

the initial introduction control part is configured to introduce the aqueous solution and the organic solvent such that the weight ratio between the aqueous solution and the organic solvent is in the range of 5:5 to 4:6, the organic solvent is a methyl ethyl ketone, and wherein the micro-mixing control part is configured such that when the micro-mixing control part stirs by rotating a stirring blade, a stirring time of the stirring blade is in the range of 10 minutes to 40 minutes.

16. The technetium 99m isolation system according to claim 1, wherein:

the initial introduction control part is configured to introduce the aqueous solution and the organic solvent such that the weight ratio between the aqueous solution and the organic solvent is in the range of 5:5 to 4:6, the organic solvent is a methyl ethyl ketone, and wherein the micro-mixing control part is configured such that:

when the micro-mixing control part stirs by rotating a stirring blade, a stirring time of the stirring blade is in the range of 10 minutes to 40 minutes, and the heating temperature of the heater heated by the micro-mixing control part is in the range of 10 degrees Celsius to 90 degrees Celsius.

17. The technetium 99m isolation system according to claim 1, wherein:
the initial introduction control part is configured to introduce the aqueous solution and the organic solvent such that the weight ratio between the aqueous solution and the organic solvent is in the range of 5:5 to 4:6,
the organic solvent is a methyl ethyl ketone,
wherein the micro-mixing control part is configured such that
when the micro-mixing control part stirs by rotating a stirring blade, a stirring time of the stirring blade is in the range of 10 minutes to 40 minutes, and
the heating temperature of the heater heated by the micro-mixing control part is in the range of 10 degrees Celsius to 90 degrees Celsius, and
wherein the separation control part is configured to stop the stirring, heating, and applying ultrasonic to the mixed solution, and leave the mixed solution naturally.

18. The technetium 99m isolation system according to claim 1, wherein:
the initial introduction control part is configured to introduce the aqueous solution and the organic solvent such that the weight ratio between the aqueous solution and the organic solvent is in the range of 5:5 to 4:6,
the organic solvent is a methyl ethyl ketone,
the micro-mixing control part is configured such that
when the micro-mixing control part stirs by rotating a stirring blade, a stirring time of the stirring blade is in the range of 10 minutes to 40 minutes,
the heating temperature of the heater heated by the micro-mixing control part is in the range of 40 degrees Celsius to 80 degrees Celsius, and
the separation control part is configured to stop the stirring, heating, and applying ultrasonic to the mixed solution, and leave the mixed solution naturally,
the evaporation control part is configured such that a heating temperature of the heater heated by the evaporation control part is in the range of 20 degrees Celsius to 80 degrees Celsius, and
the evaporation control part is configured to reduce pressure inside the evaporation elution tank to pressure lower than the atmospheric pressure by a predetermined decompression value, wherein the decompression value is in the range of 5% to 20% of the atmospheric pressure.

19. The technetium 99m isolation system according to claim 1, wherein:
the initial introduction control part is configured to introduce the aqueous solution and the organic solvent such that the weight ratio between the aqueous solution and the organic solvent is in the range of 5:5 to 4:6,
the organic solvent is a methyl ethyl ketone,
the micro-mixing control part is configured such that a heating temperature of the heater heated by the micro-mixing control part is in the range of 40 degrees Celsius to 80 degrees Celsius,
the separation control part is configured to stop the stirring, heating, and applying ultrasonic to the mixed solution, and leave the mixed solution naturally,
the leaving time is in the range of 2 minutes to 10 minutes,
wherein the evaporation control part is configured such that a heating temperature of the heater heated by the evaporation control part is in the range of 20 degrees Celsius to 80 degrees Celsius, and
the evaporation control part is configured to reduce pressure inside the evaporation elution tank to pressure lower than the atmospheric pressure by a predetermined decompression value, wherein the decompression value is in the range of 5% to 20% of the atmospheric pressure.

\* \* \* \* \*